(12) United States Patent
Suenaga

(10) Patent No.: US 6,921,507 B2
(45) Date of Patent: Jul. 26, 2005

(54) METHOD FOR MANUFACTURING A PRODUCT OF THERMOPLASTIC RESIN AND/OR THERMOPLASTIC ELASTOMER

(75) Inventor: Toshihiko Suenaga, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 413 days.

(21) Appl. No.: 10/173,778

(22) Filed: Jun. 19, 2002

(65) Prior Publication Data

US 2003/0030171 A1 Feb. 13, 2003

(30) Foreign Application Priority Data

Aug. 10, 2001 (JP) ........................................ 2001-244648

(51) Int. Cl.⁷ .......................... B28B 11/16; B29C 47/00; B29C 53/00; B29C 47/12
(52) U.S. Cl. ........................ 264/146; 264/148; 264/157; 264/177.1; 264/177.16
(58) Field of Search ................................. 264/145, 157, 264/146, 148, 177.1, 177.16

(56) References Cited

U.S. PATENT DOCUMENTS 5,728,161 A * 3/1998 Camino et al. .......... 623/22.41

* cited by examiner

Primary Examiner—Stephen J. Lechert, Jr.
(74) Attorney, Agent, or Firm—Arent Fox, PLLC (57) ABSTRACT

The object of the present invention is to provide a method for manufacturing a product of thermoplastic resin and/or thermoplastic elastomer with materials of high recycle capability, preventing the productivity drop and the cost increase as well as the damage caused by the contact between semi-finished products and a drawing machine. A plurality of semi-finished moles and a drawing element are molded integrally by an extruder. The semi-finished moles are separated from the drawing element by cutting. The semi-finished moles separated from the drawing element are cut in accordance with a given length to produce a mole.

8 Claims, 10 Drawing Sheets

METHOD FOR MANUFACTURING A PRODUCT OF THERMOPLASTIC RESIN AND/OR THERMOPLASTIC ELASTOMER

FIELD OF THE INVENTION

The present invention relates to a method for manufacturing a product of thermoplastic resin and/or thermoplastic elastomer, which is used for interior and exterior moldings, and door and body seals.

Figure 12:
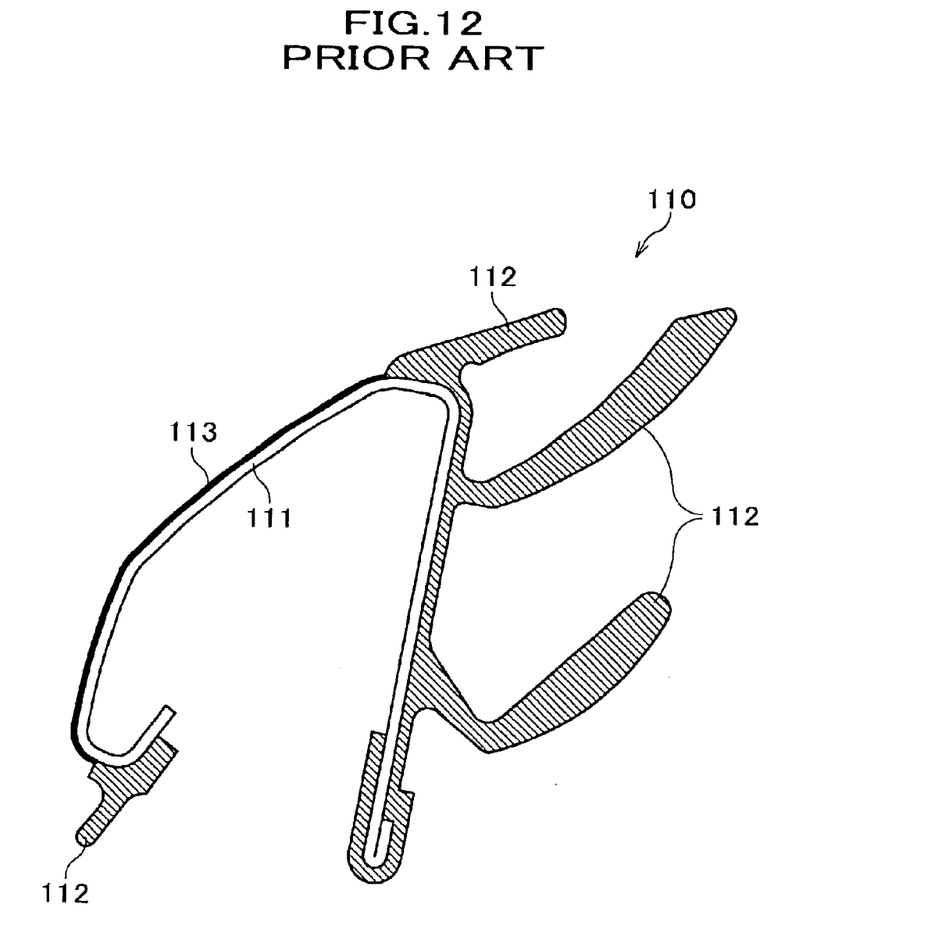
FIG. 12 is a cross sectional view showing the molding according to the prior art.

The parts manufactured by extrusion such as interior and exterior moldings and door and body seals include; a door molding, an inner weather strip, a drip molding, a window molding, a roof molding, an opening trim, an opening seal, a trunk lid seal, a tail gate seal, a door seal and a run channel. As an example, the part such as shown in FIG. 12 has been manufactured conventionally. A molding 110 has been manufactured with a metallic core 111 made of aluminum alloy or stainless steel, to which a seal 112 made of a PVC material of thermoplastic resin or an EPDM material of rubber or thermoplastic elastomer and a decorative surface 113 are integrally molded by extrusion molding. An elastomer is an elastic resin like rubber and a thermoplastic elastomer is a rubber-like molding material which can be molded by the remelt treatment. And a thermoplastic resin is an inelastic resin which can be molded by the remelt treatment.

The process for manufacturing the mold mentioned above is shown in FIG. 13. At an extrusion step S10, a metallic core material M, a lip material L and a decorative material D, which are composed of a PVC material of thermoplastic resin, are supplied to an extruder 120 where an extrusion molding is performed. A semi-finished molding 115 is manufactured and is supplied to a cooling step S20. At the cooling step S20, the semi-finished molding 115 is cooled down passing through a cooling chamber 121. At a drawing step S30 subsequent to the cooling step S20, the semi-finished molding 115 is drawn with the rotation of a drawing machine 122. Drawing by the drawing machine 122 gives the drawing force to the semi-finished molding 115 at the cooling step S20.

Figure 13:
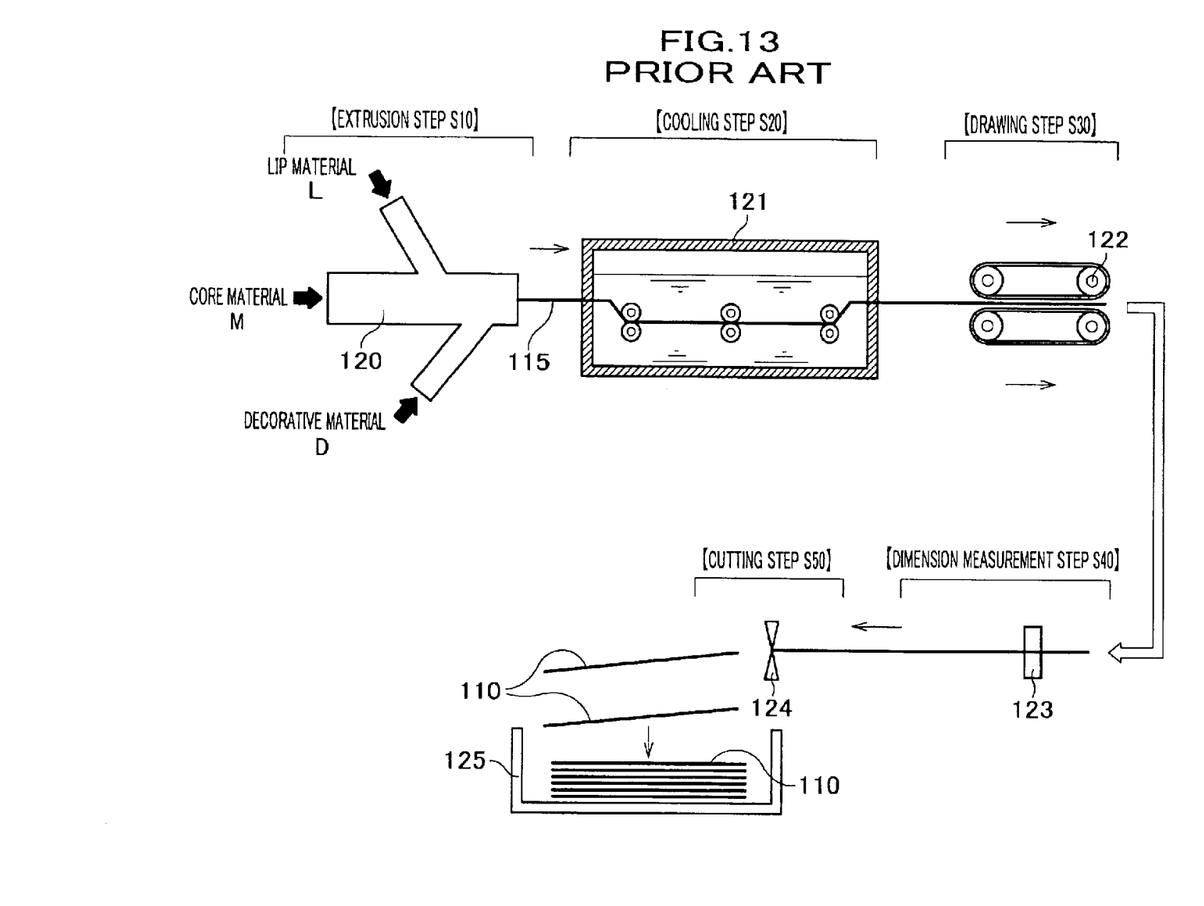
FIG. 13 is a process flow diagram illustrating the manufacturing of the molding according to the prior art.

The semi-finished molding 115 is supplied to a dimension measurement step S40 from the drawing step S30 and measured up. And at a cutting step S50, the semi-finished molding is cut in accordance with the required length measured at the dimension measurement step S40 by a cutting machine 124 to produce a molding 110, which is stored in a container 125.

The molding 110 including the metallic core 111 made of a metal, to which the seal 112 and the decorative surface 113 made of the thermoplastic resin are integrally molded, is difficult to be recycled, thereby giving rise to environmental pollution caused by poisonous gasses when it is incinerated. The part made of olefinic material thoroughly has been recently introduced, in which a core is also made of thermoplastic resin, so that the core can be recycled. This type of part can be manufactured by the same process as that shown in FIG. 13.

However, manufacturing of the thorough olefinic parts has been suffered from the following problems.

The rupture, the surface waviness and the rough surface of the core will possibly occur if the part of thorough olefinic material is manufactured under the same extrusion speed as that of the part with a metallic core. In order to prevent the problems such as surface waviness, the extrusion speed must be slowed down to approximately one fifth of that applied to the manufacturing of the part with a metallic core. It will lower the productivity, thereby giving rise to the remarkable cost increase. If the parallel operation with plural extruders to compensate the productivity drop is introduced, more drawing machines are required for that.

The drawing machine has been possibly caused damage to the seal or the decorative surface of the molding since the drawing machine requires interposing the molding for drawing. It is possible to lower the interposing force of the drawing machine in order not to cause damage on the seal or the decorative surface of the molding, though another problem could occur that the slipping due to the resultant decrease in the drawing force renders the drawing machine inoperable.

SUMMARY OF THE INVENTION

The object of the present invention to assess the problems is to provide a method for manufacturing a product of thermoplastic resin and/or thermoplastic elastomer with materials of high recycle capability, preventing the productivity drop and the cost increase as well as the damage caused by the contact between the semi-finished products and the drawing machine.

The invention to assess the problems described above provides a method for manufacturing a product of thermoplastic resin or thermoplastic elastomer, or a hybrid product of thermoplastic resin and thermoplastic elastomer, the method comprising the steps of: molding integrally a plurality of semi-finished products and a drawing element by extrusion, which comprise thermoplastic resin or thermoplastic elastomer, or a hybrid of thermoplastic resin and thermoplastic elastomer; separating the plurality of semi-finished products from the drawing element by cutting in a drawing direction; drawing the drawing element separated from the plurality of semi-finished products by a drawing machine, thereby continuing to draw the plurality of semi-finished products and the drawing element which are before separation; and cutting the plurality of semi-finished products at a given length from which the drawing element has been separated.

The invention according to claim 1 provides a method of manufacturing a product by molding the plural semi-finished products and the drawing element integrally, thereby obviating the productivity drop even if the extrusion speed is lowered.

When the semi-finished products are drawn at the previous stage of manufacturing the finished product, the drawing element, which is molded integrally with the semi-finished product, is drawn by the drawing machine. The semi-finished products are not required to be in contact with the drawing machine, which will obviate the damage caused by the contact with the drawing machine.

The invention according to claim 2 provides the method for manufacturing a product of thermoplastic resin or thermoplastic elastomer, or a hybrid product of thermoplastic resin and thermoplastic elastomer according to claim 1, wherein the plurality of semi-finished products and the drawing element comprise an olefinic material.

The invention according to claim 2 employs the olefinic materials—desirable for recycling-both for the semi-finished products and the drawing element. Therefore, the recycling of the product can be conducted properly when it is scrapped. Also, the drawing element can be reused for the material of extrusion molding repeatedly not scrapped.

The invention according to claim 3 (or 4) provides the method for manufacturing a product of thermoplastic resin or thermoplastic elastomer, or a hybrid product of thermoplastic resin and thermoplastic elastomer according to claim 1 (or 2), wherein the thickness of connecting elements for connecting the plurality of semi-finished products and the drawing element is from no less than 0.5 mm to no more than 10 mm.

If the thickness of the connecting elements between the semi-finished products and the drawing element is less than 0.5 mm, the semi-finished products and the drawing element tend to separate accidentally. On the contrary, if it is more than 10 mm, it may possibly be time-consuming to separate the semi-finished products from the drawing element. It is the reason why the invention according to claim 3 specifies the range of no less than 0.5 mm to no more than 10 mm for the thickness of the connecting elements. This range of thickness will prevent the accidental separation of the product material from the drawing element and render the cutting easier at the separation step.

The invention according to claim 5, (6, 7 or 8) provides the method for manufacturing a product of thermoplastic resin or thermoplastic elastomer, or a hybrid product of thermoplastic resin and thermoplastic elastomer according to claim 1, (2, 3 or 4), wherein the plurality of semi-finished products are oriented facing in a common direction.

When the product has a surface sliding on the glass, hair transplanting is sometimes made on it. In case the sliding surface where the hair transplanting is made is on one surface of the product, the semi-finished products need to be oriented in a given direction. The invention according to claims 5 through 8 eliminates a step to rotate the semi-finished products to align the sliding surfaces, since the semi-finished products face in a common direction.

DESCRIPTION OF THE PREFERRED EMBODIMENTS

The embodiment of the present invention will now be described referring to the accompanying drawings.

Figure 1:
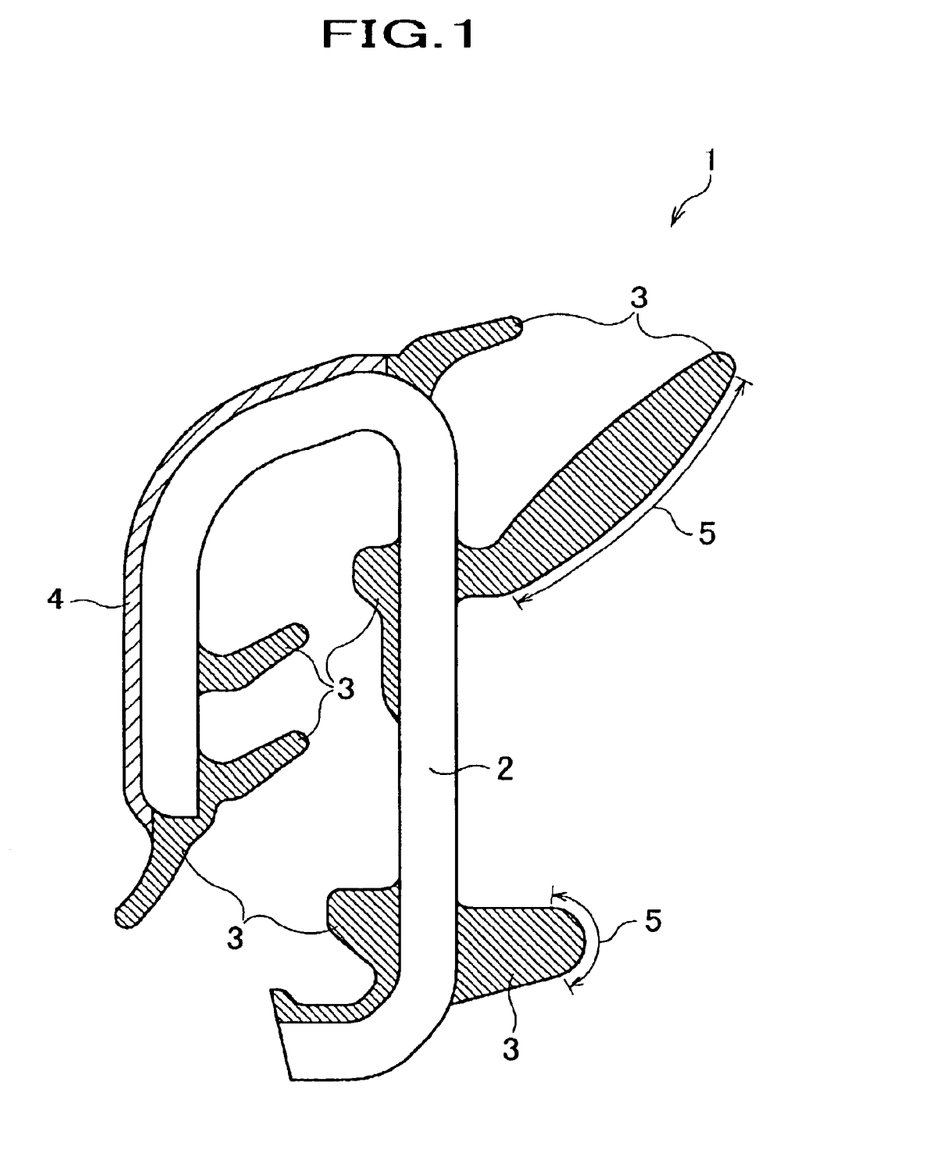
FIG. 1 is a cross sectional view showing a product of thermoplastic resin and thermoplastic elastomer according to the present invention.

FIG. 1 is a sectional view showing a molding of thermoplastic resin and thermoplastic elastomer according to the present invention.

The method for manufacturing a molding 1 such as a door molding, which has the cross section shown in FIG. 1, will be described. The molding 1 is a long product, which is cut out from a semi-finished molding manufactured by extrusion, including a core 2, a lip 3 and a decorative surface 4. The core 2 is made of PP (polypropylene) of thermoplastic resin, which has some degree of hardness and stiffness. On the other hand the lip 3 and the decorative surface 4 are made of TPO (thermo plasticelastomer olefin) resin of thermoplastic elastomer, which have elasticity. The core 2, the lip 3 and the decorative surface 4 are all made of the olefinic materials of thermoplastic resins, which are desirable in terms of recycling.

The molding 1 shown in FIG. 1 is cut out from the long semi-finished molding manufactured by extrusion. In this embodiment, the four of the same shape semi-finished moldings are manufactured simultaneously. The plural semi-finished moldings are integrally molded connected to a drawing element with respective connecting elements (the whole part including the semi-finished molding connected to the drawing element with the connecting elements hereinafter referred to as extrusion molded part).

Figure 2:
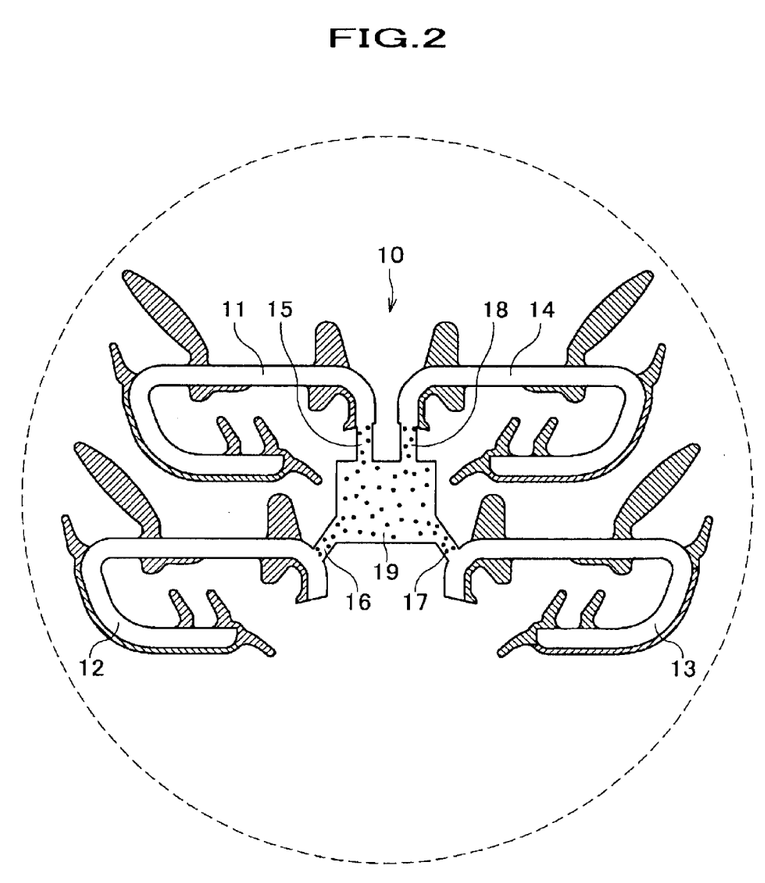
FIG. 2 is a cross sectional view showing an extrusion molded part.

Before the description of the manufacturing process, an example of the position of the semi-finished moldings and the drawing element of an extrusion molded part will be described referring to FIG. 2. An extrusion molded part 10 has four semi-finished moldings 11–14, which are simultaneously extruded. As shown in FIG. 2, the four semi-finished moldings 11–14 of the extrusion molded part 10 have the same shape and are oriented so that they face in a common direction vertically: each of sliding surfaces 5 of the lips 3 is oriented upward, which is slidably in contact with a glass when mounted on a vehicle. The four semi-finished moldings 11–14 are connected to a drawing element 19 with connecting elements 15–18, respectively. Each of the connecting portions between the semi-finished moldings 11–14 and the connecting elements 15–18 is located so that it may not interfere with the decorative surface 4 (see FIG. 1). Therefore, the surface 4 can be kept free of damage, even if the separating surfaces between the semi-finished moldings 11–14 and the connecting elements 15–18 become rough or irregular at the separation.

It is preferred that the thickness of the connecting elements 15–18 be set in the range of no less than 0.5 mm to no more than 10 mm. If it is less than 0.5 mm, it is probable that the connecting element 15–18 will break. On the other hand, if it exceeds 10 mm, the big force is required for cutting off the connecting elements 15–18.

The drawing element 19 is approximately rectangle, from the upper surface of which the first and fourth connecting elements 15 and 18 extend to be connected to the ends of the cores of the first and fourth semi-finished moldings 11 and 14, respectively. On the other hand, the second and third connecting elements 16 and 17 extend diagonally downward from the lower corners of the drawing element 19 and are connected to the ends of the cores of the second and third semi-finished moldings 12 and 13. The semi-finished moldings 11–14 are oriented around the drawing element 19 so that the envelope falls in a circle shown with the dotted line in FIG. 2. If the four connecting elements are aligned in a line, it will require increasing of the inner diameter and the effective diameter of an extruder, which necessitates an extruder with a bigger mouthpiece. The above mentioned positioning of a near circle is preferable in order to obviate the need for such a big extruder.

When the plural semi-finished moldings are manufactured in parallel, the existing mouthpiece which has been employed conventionally will still be competent without modification, since the near circular positioning of the semi-finished moldings 11–14 doesn't necessitate a big mouthpiece. Also the semi-finished moldings 11–14 are subjected to the uniform extrusion pressure by positioning them in a near circle. Thus the shape of the manufactured molding can be stabilized.

Figure 3:
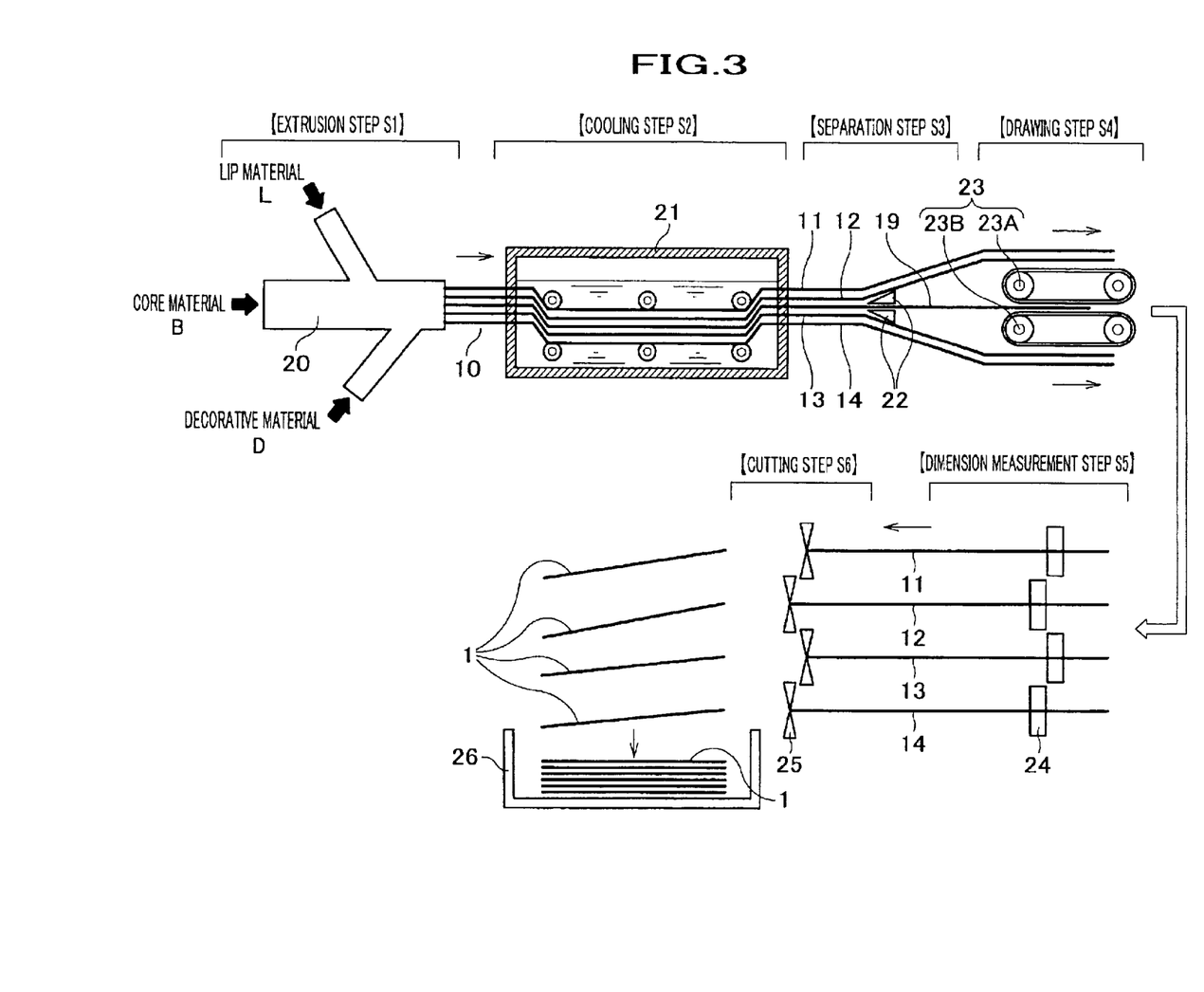
FIG. 3 is a process flow diagram showing the steps of manufacturing molding from an extrusion molded part.

The process of manufacturing the moldings shown in FIG. 1 from the extrusion molded part shown in FIG. 2 will be described referring to FIG. 3. As shown in FIG. 3, at an extrusion step S1 the extrusion molded part 10 is extrusion molded by an extruder 20. A core material B of PP, a lip material L and a decorative material D of TPO are supplied to the extruder 20. The extruder 20 molds the extrusion molded part 10 with these materials by the extrusion molding.

The extrusion molded part 10 molded at the extrusion step S1 is carried to a cooling step S2. At the cooling step S2, the extrusion molded part 10 is cooled down to an appropriate temperature passing through a water tank 21.

The extrusion molded part 10 cooled down at the cooling step S2 is carried to a separation step S3. At the separation step S3, a separation unit 22 is provided, which is for separating the semi-finished moldings 11–14 from the drawing element 19. The separation unit 22 comprises the physical cutting means such as a cutter or the melt cutting means such as a heat coil. The four semi-finished moldings 11–14 are cut off from the drawing element 19 by the separation unit 22. Subsequently, the semi-finished moldings 11–14 are carried to a dimension measurement step S5 and the drawing element 19 is carried to a drawing step S4. A drawing machine 23 for drawing the drawing element 19 is prepared at the drawing step S4. The drawing machine 23 has an upper conveyer 23A and a lower conveyer 23B, both of which interpose the drawing element 19 to draw it by the rotation of the upper and lower conveyers 23A and 23B.

When the drawing machine 23 draws the drawing element 19, the upper and lower surfaces of the drawing element 19 are preferably flat, since the upper and lower conveyers 23A and 23B interpose the drawing element 19 pressing it vertically. Only by separating the semi-finished moldings 11–14 from the connecting elements 15–18, the connecting elements 15–18 remain projecting from the upper and lower surfaces of the drawing element 19. It is thereby difficult to interpose the drawing element 19 by the upper and lower conveyers 23A and 23B. Therefore, at the separation step S3, the connecting elements 15–18 are separated from the drawing element 19 as well as the semi-finished moldings 11–14 from the connecting elements 15–18. The upper and lower surfaces of the drawing element 19 is rendered flat by separating the connecting elements 15–18, thereby allowing the upper and lower conveyers 23A and 23B to interpose the drawing element 19 securely. As a result, the drawing element 19 can be drawn stably; thereby the extrusion molded part 10 as well.

The drawing machine 23, which draws the drawing element 19, gives the continuous drawing force to the semi-finished moldings 11–14 and the extrusion molded part 10. The semi-finished moldings 11–14 are not interposed by the drawing machine 23 under the pressing force, thereby free from the damage. So the drawing machine 23 can interpose the drawing element 19 with relatively large force, for it is not necessary to decrease the interposing force. Therefore, the drawing machine 23 can prevent the slip between the drawing machine 23 and the drawing element 19.

The four semi-finished molding 11–14 separated from the drawing element 19 at the separation step S3 are carried to the dimension measurement step S5. At the dimension measurement step S5 a dimension measurement unit 24 is prepared to measure the semi-finished moldings 11–14 for cutting and carry them to the following cutting step S6. At the cutting step S6, a cutting machine 25 is prepared, which cuts the semi-finished moldings 11–14 according to the dimension measured at the dimension measurement step S5 to produce the molding 1. The manufactured molding 1 is stored in a container 26.

By manufacturing the molding 1 with the extrusion molded part 10, which includes the plural semi-finished moldings 11–14, the reduction in the productivity will be restrained even if the extrusion speed is slowed down compared with the case in which a metallic core is employed. Therefore, the products such as recycling adaptable moldings can be manufactured obviating the productivity drop. The existing extruder which has been used hitherto is competent for the extruder 20, since the large mouthpiece of an extruder is rendered unnecessary by orienting the semi-finished moldings 11–14 in a circle envelope.

The drawing operation can be performed so that the drawing machine 23 may not be in contact with the semi-finished moldings 11–14, since the drawing machine draws the whole extrusion molded part 10 interposing only the drawing element 19, to which the semi-finished moldings 11–14 are connected. Therefore the semi-finished moldings 11–14 are free from the damage caused by the drawing machine 23 coming into contact with the semi-finished moldings 11–14. Each of the semi-finished moldings 11–14 is so oriented that sliding surfaces 5 (see FIG. 1) see upward. A step to turn around the semi-finished moldings 11–14 can thus be omitted when a treatment such as the hair planting is given to the sliding surfaces 5.

Next, another example of an extrusion molded part, to which the method for manufacturing a product of thermoplastic resin and thermoplastic elastomer according to the present invention is applied, will be described referring to FIG. 2. Each shape of the following extrusion molded parts can be molded by modifying the shape of the mouthpiece for the extruder 20.

Figure 4:
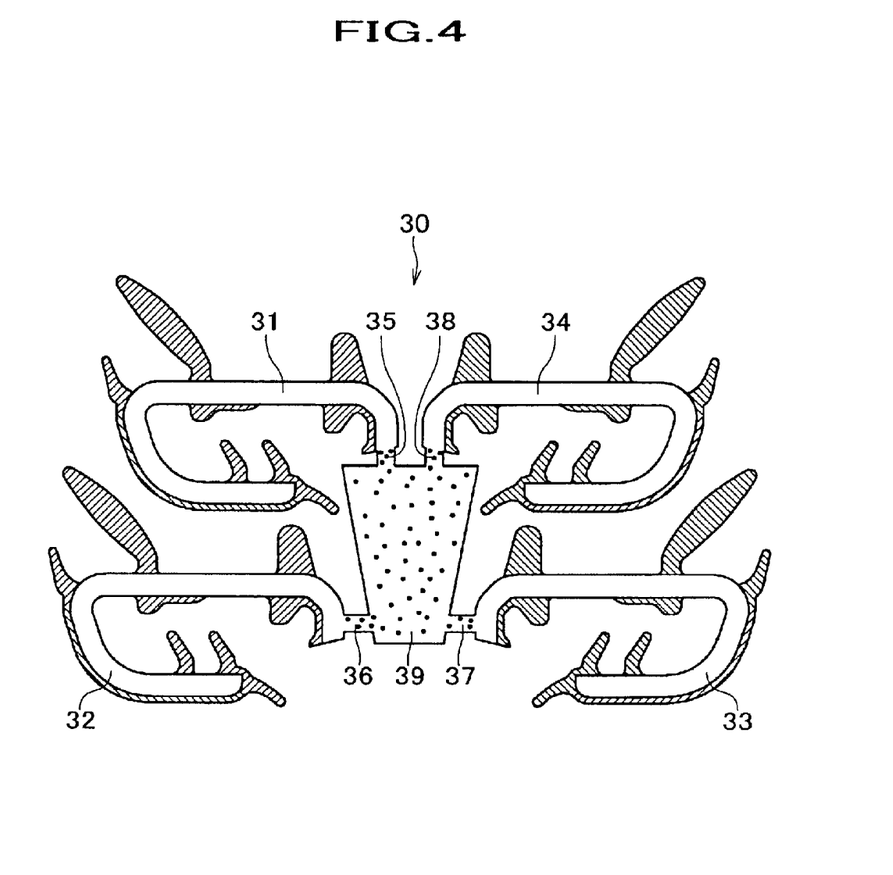
FIG. 4 is a cross sectional view of the extrusion molded part according to the second embodiment.

FIG. 4 is a cross sectional view showing the extrusion molded part according to the second embodiment.

As shown in FIG. 4, an extrusion molded part 30 has four semi-finished moldings 31–34, which have the same shape and are connected to a drawing element 39 with connecting elements 35–38, respectively. Each of the semi-finished moldings 31–34 is oriented so that the sliding surfaces 5 see upward in the extrusion molded part 30. The drawing element 39 has the cross section of trapezoid, from the upper surface of which the connecting elements 35 and 38 extend to be connected to the upward semi-finished moldings 31 and 34. The connecting elements 36 and 37, which extend sideward from the lower portions of the sides of the drawing element 39, are connected to the downward semi-finished moldings 32 and 33. The molding 1 according to the second embodiment is also manufactured in accordance with the process flow shown in FIG. 3. In the extrusion molded part 30, the semi-finished moldings 31–34 are positioned better balanced since they are positioned as described above around the drawing element 39 of a trapezoidal cross section. Therefore, the high stability of extrusion shape by the extruder 20 can be maintained. When the drawing machine 23 interposes the drawing element 39 vertically at drawing, the connecting elements 36 and 37 will be of no interference even if they remain on the drawing element 39, since they extend sideway from the drawing element 39. Therefore, at the separation step S3 the drawing machine 23 can perform the secure drawing interposing the drawing element 39 even if the separation of the downward connecting elements 36 and 37 from the drawing element 39 is omitted.

Figure 5:
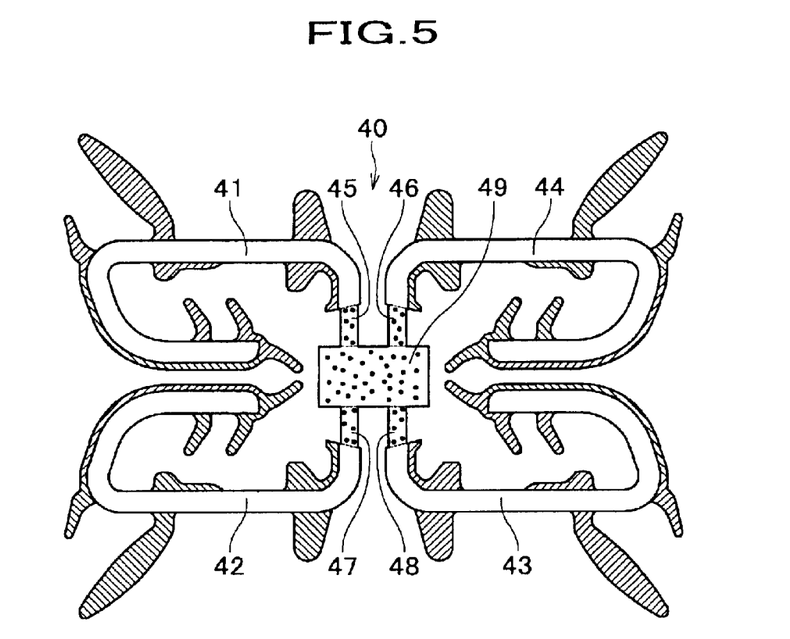
FIG. 5 is a cross sectional view of the extrusion molded part according to the third embodiment.

FIG. 5 is a cross sectional view showing the extrusion molded part according to the third embodiment.

As shown in FIG. 5, an extrusion molded part 40 has four semi-finished moldings 4144, which have the same shape and are connected to a drawing element 49 with connecting elements 45–48, respectively. The four semi-finished moldings 4144 are oriented symmetrical in both vertical and horizontal directions relative to a drawing element 49. The semi-finished moldings 41–44 are accordingly oriented better balanced in the extrusion molded part 40 than those in the molding extrusion molded parts 10 and 30, which results in the better stability of molding of the extrusion molded part 40 by the extruder 20.

Figure 6:
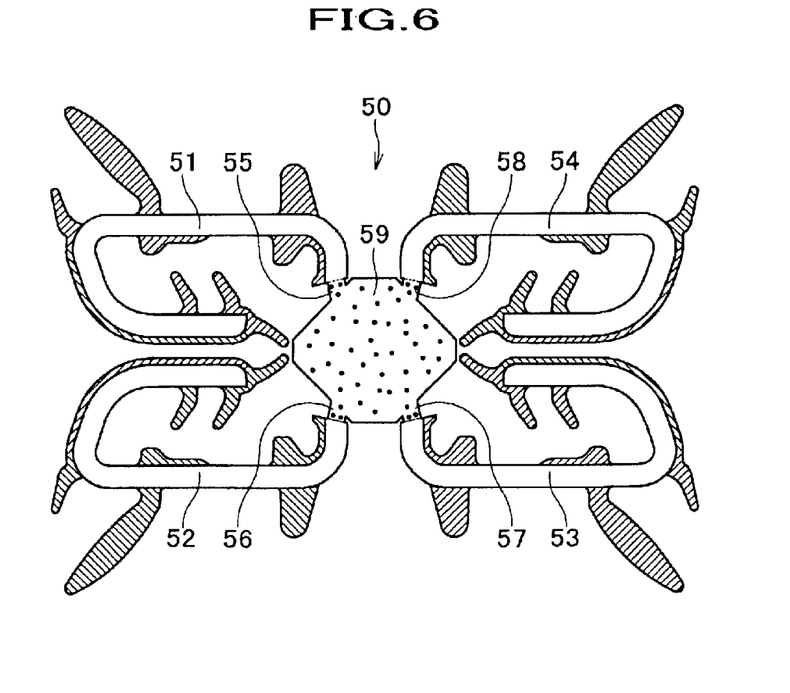
FIG. 6 is a cross sectional view of the extrusion molded part according to the fourth embodiment.

FIG. 6 is a cross sectional view showing the extrusion molded part according to the fourth embodiment.

As shown in FIG. 6, an extrusion molded part 50 has four semi-finished moldings 51–54, which have the same shape and are connected to a drawing element 59 with connecting elements 55–58, respectively. The four semi-finished moldings 51–54 are oriented symmetrical in both vertical and horizontal directions relative to a drawing element 59. The high stability of extrusion molding by the extruder 20 is also attained like the third embodiment described before.

The drawing element 59 has the cross section of hexagon, the top and bottom sides of which are slightly longer than the remaining sides. The top ends of the connecting elements 55 and 58, which connect the upward semi-finished moldings 51 and 54 to the drawing element 59, stand lower than the top surface of the drawing element 59. On the other hand, the bottom ends of the connecting elements 56 and 57, which connect the downward semi-finished moldings 52 and 53 to the drawing element 59, stand higher than the bottom surface of the drawing element 59.

The connecting elements 55–58 will not go over the top or bottom surface of the drawing element 59 even if the connecting element 55–58 are not separated from the drawing element 59 at the separation of the semi-finished moldings 51–54. The semi-finished moldings 51–54 may thus be separated from the connecting element 55–58 respectively leaving the connecting element 55–58 on the drawing element 59 at the separation step S3 shown in FIG. 3.

At the subsequent drawing step S4, the drawing machine 23 adds the drawing force to the drawing element 59 interposing it vertically with the upper and lower conveyers 23A and 23B. When the drawing machine 23 interposes the drawing element 59 vertically, the connecting elements 55–58 will be of no interference, since they stand receding from the top or bottom surface of the hexagonal cross section of the drawing element 59 as shown in FIG. 6. Therefore, the extrusion molded part 50 according to the fourth embodiment can be manufactured obviating the operation, in which the connecting elements 55–58 are separated from the drawing element 59.

Figure 7:
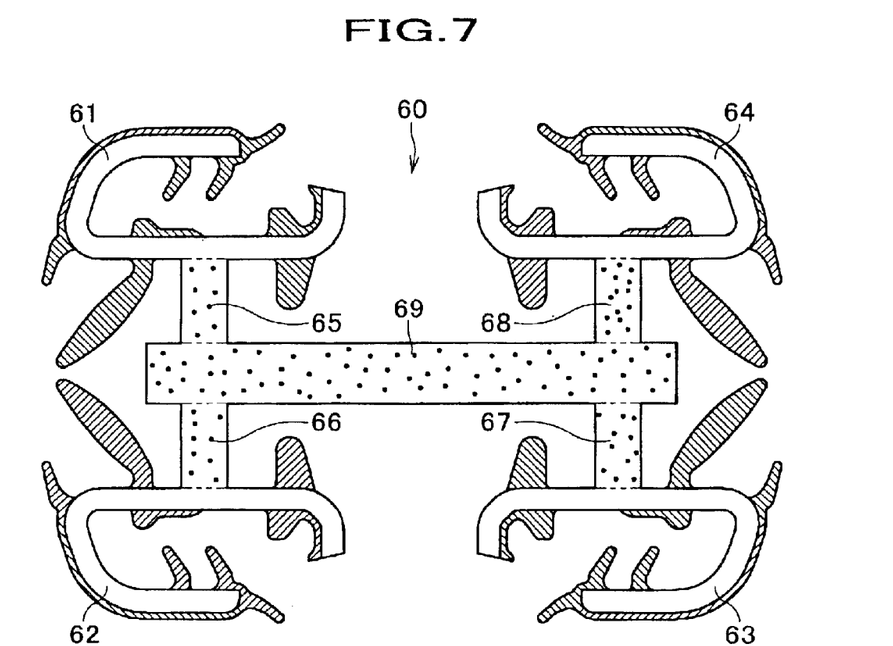
FIG. 7 is a cross sectional view of the extrusion molded part according to the fifth embodiment.

FIG. 7 is a cross sectional view showing the extrusion molded part according to the fifth embodiment.

As shown in FIG. 7, an extrusion molded part 60 has four semi-finished moldings 61–64, which have the same shape and are connected to a drawing element 69 with connecting elements 65–68, respectively. The drawing element 69 has the cross section of long sideways rectangle. The connecting elements 65–68 extend from the both ends of top and bottom surfaces. In the extrusion molded part 60 according to the fifth embodiment, the stability of extrusion shape by the extruder 20 can be attained, since the four semi-finished moldings 61–64 are oriented horizontally symmetrical relative to the drawing element 69.

The drawing element 69 is designed so that its cross section has the shape of long sideways rectangle. Running the upper conveyer 23A between the upward connecting elements 65 and 68, and the lower conveyer 23B between the downward connecting elements 66 and 67, the drawing machine 23 can interpose the drawing element 69 at the drawing step S4, even if the connecting elements 65–68 are not separated from the drawing element 69. The drawing machine 23 can thus interpose and draw the drawing element 69 securely only by separating the semi-finished moldings 61–64 from the connecting parts 65–68 respectively, obviating the separation of the connecting parts 65–68 from the drawing element 69.

Figure 8:
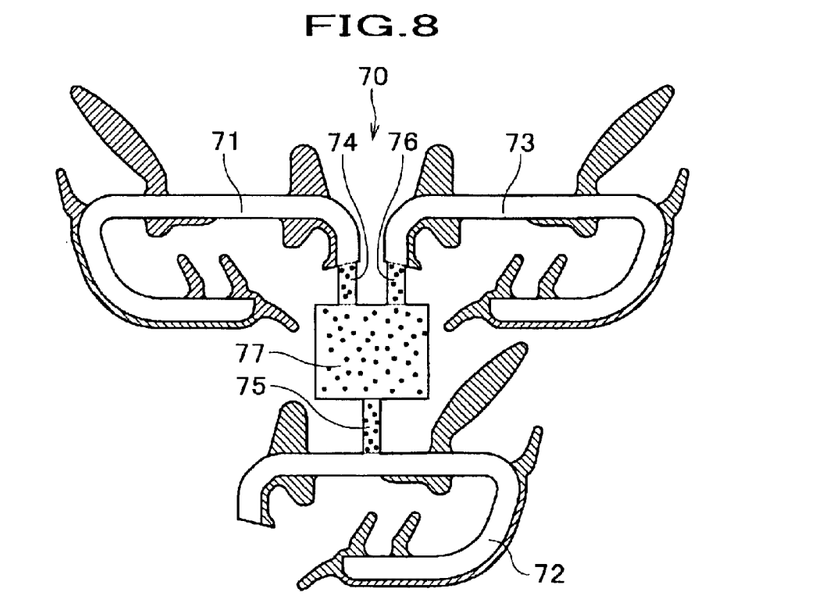
FIG. 8 is a cross sectional view of the extrusion molded part according to the sixth embodiment.

FIG. 8 is a cross sectional view showing the extrusion molded part according to the sixth embodiment.

As shown in FIG. 8, an extrusion molded part 70 has three semi-finished moldings 71–73, which have the same shape and are connected to a drawing element 77 with connecting elements 74–76, respectively. The drawing element 77 has the cross section of rectangle. The connecting elements 74 and 76 extend upward from the top surface of the drawing element 77, and the connecting element 71 downward from the bottom surface. The sixth embodiment provides the extrusion molded part 70, by which manufacturing of three semi-finished moldings 71–73 in parallel can be effected.

The sides of the drawing element 77 are flat and the connecting elements 74–76 stay out of the side regions. The operation of separating the connecting elements 74–76 from the drawing element 77 at the separation step S3 can be omitted if a drawing machine which has the right and left conveyers to interpose the drawing element 77 is introduced instead of the drawing machine 23.

Figure 9:
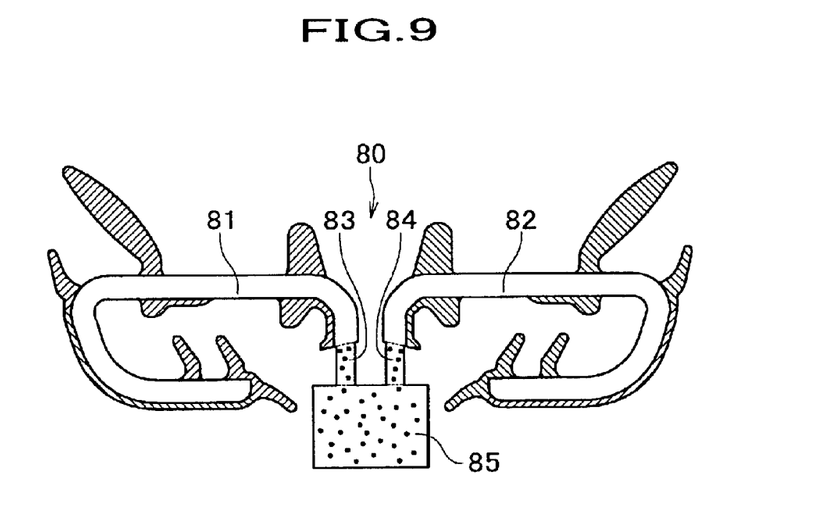
FIG. 9 is a cross sectional view of the extrusion molded part according to the seventh embodiment.

FIG. 9 is a cross sectional view showing the extrusion molded part according to the seventh embodiment.

As shown in FIG. 9, an extrusion molded part 80 has two semi-finished moldings 81 and 82, which have the same shape and are connected to a drawing element 85 with connecting elements 83 and 84, respectively. The drawing element 85 has the cross section of rectangle, from the top surface of which the connecting elements 83 and 84 extend upward to be connected to the semi-finished moldings 81 and 82. The seventh embodiment provides the extrusion molded part 80, by which manufacturing of two semi-finished moldings 81 and 82 in parallel can be attained.

Both sides of the drawing element 85 are flat and the connecting elements 83 and 84 stay out of the side regions. The operation of separating the connecting elements 83 and 84 from the drawing element 85 at the separation step S3 can be omitted if a drawing machine which has the right and left conveyers to interpose the drawing element 85 is introduced instead of the drawing machine 23.

Figure 10:
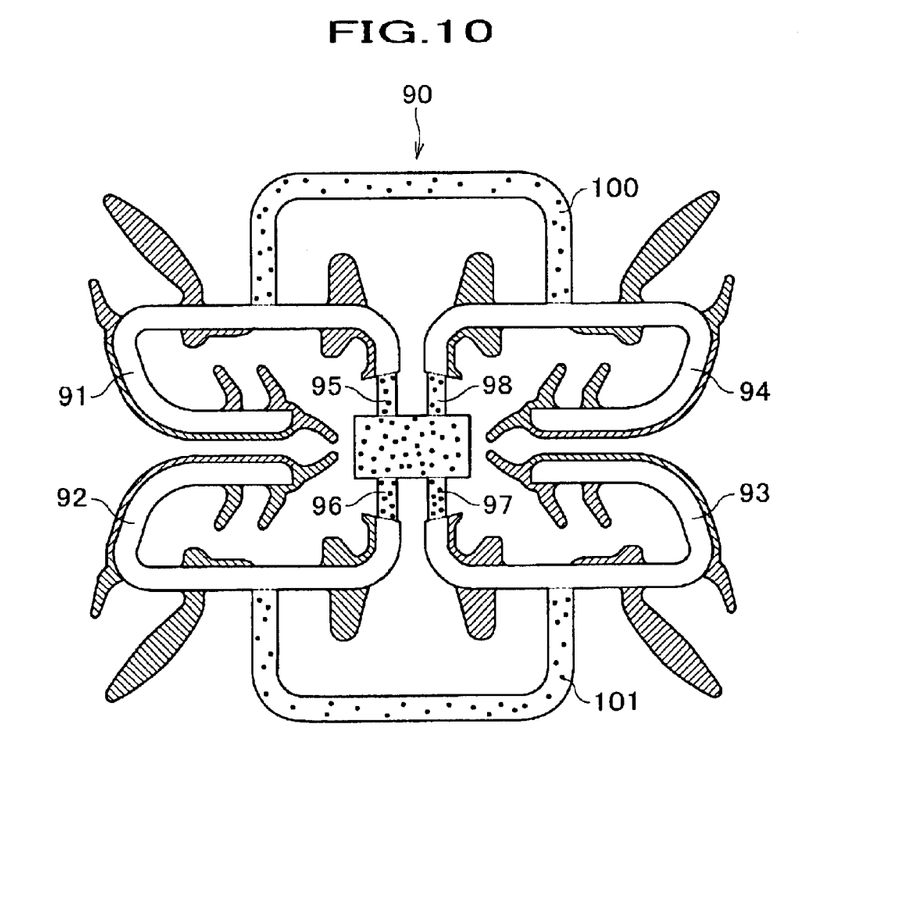
FIG. 10 is a cross sectional view of the extrusion molded part according to the eighth embodiment.

FIG. 10 is a cross sectional view showing the extrusion molded part according to the eighth embodiment.

As shown in FIG. 10, an extrusion molded part 90 has four semi-finished moldings 91–94, which have the same shape and are connected to a drawing element 99 with connecting elements 95–98, respectively. The disposition of the extrusion molded part 90 is the same as that of the third embodiment shown in FIG. 5. A bridge 100 connects the upward semi-finished moldings 91 and 94, and a bridge 101 connects the downward semi-finished moldings 92 and 93. These bridges reinforce the strength of the combination of the semi-finished moldings 91 and 94, and the semi-finished moldings 92 and 93, respectively.

In the preparation of drawing the semi-finished moldings 91–94 by the drawing machine 23, the bridges 100 and 101 are separated from the semi-finished moldings 91–94 at the separation step S3. Subsequently the connecting elements 95–98 are separated from the drawing element 99, and the semi-finished moldings 91–94 are cut out from the connecting elements 95–98, respectively. This will complete the separation at the separation step S3.

Figure 11A:
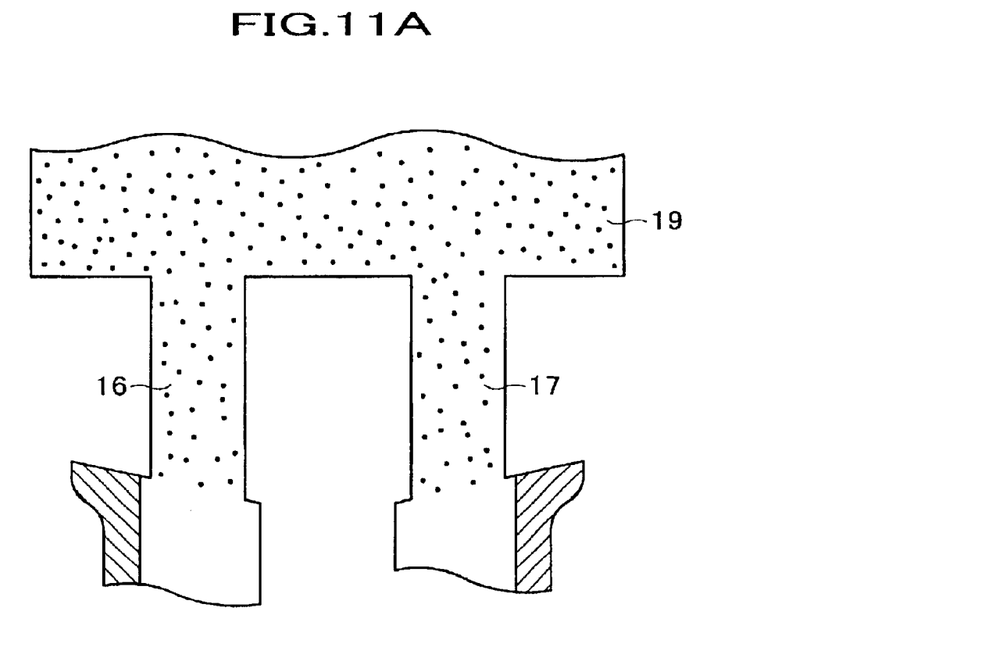
FIG. 11A is an enlarged view of the connecting element shown in FIG. 2.

A connecting element with reduced portions can also be employed instead of the uniform connecting element in the embodiments described above. FIG. 11A is an enlarged view showing the connecting element shown in FIG. 2 and FIG. 11B is an enlarged view showing the connecting element with reduced portions.

Figure 11B:
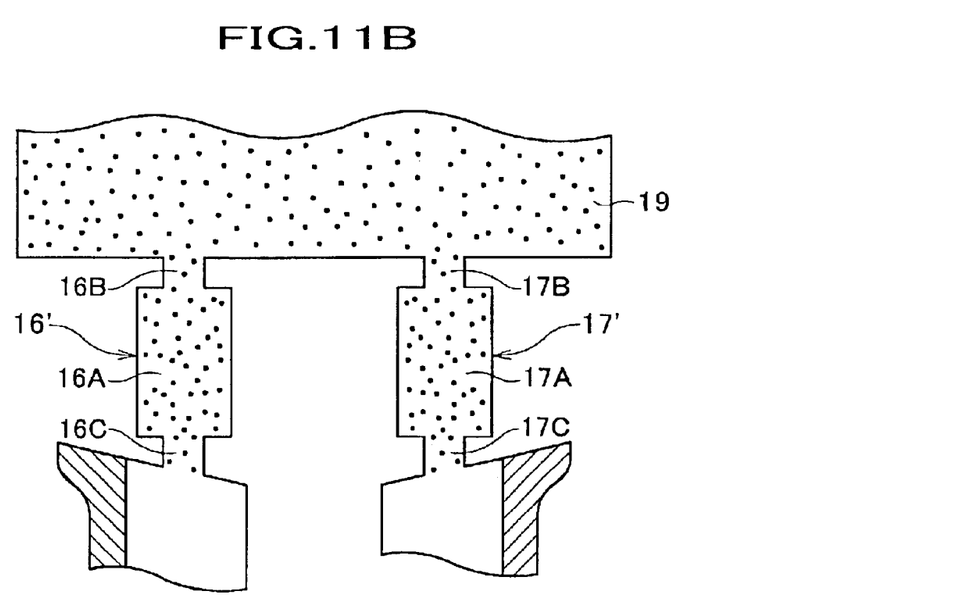
FIG. 11B is an enlarged view showing connecting elements with reduced portions.

As shown in FIG. 11B, a connecting element 16' with reduced portions has a main portion 16A with reduced portions 16B and 16C at both ends. Providing the reduced portions, the stiffness of the whole extrusion molded part can be attained and the force required for the separation can be reduced as well.

In the case of the uniform connecting elements 16 and 17 shown in FIG. 11A, the thickness of no less than 0.5 mm to no more than 10 mm is appropriate as described before. On the other hand, when the reduced portions 16B, 16C, 17B and 17C are provided as shown in FIG. 11B, their thickness of no less than 0.5 mm to no more than 10 mm will be desirable.

It goes without saying that the connecting element according to other embodiments can also have reduced portions.

It will now be appreciated from the foregoing description that the present invention is not limited to the particularly illustrated embodiment discussed above and may be carried out in various modified forms. In the embodiments described above, the descriptions have been made typically for the molding as a product, though the method can be applied to other products such as seals. In the above-mentioned embodiments, a connecting element is prepared for each semi-finished molding, which is for connecting a drawing element and a semi-finished molding. Two connecting elements or more can be provided for a semi-finished molding. The molding according to the embodiments described above is a product of both thermoplastic resin and thermoplastic elastomer. The present invention can also be applied to other products such as a product of thermoplastic resin only or a product of thermoplastic elastomer only.

What is claimed is:

1. A method for manufacturing a product of thermoplastic inelastic resin or thermoplastic elastomer, or a hybrid product of thermoplastic inelastic resin and thermoplastic elastomer, said method comprising the steps of: molding integrally a plurality of semi-finished products and a drawing element by extrusion, which comprise thermoplastic inelastic resin or thermoplastic elastomer, or a hybrid of thermoplastic inelastic resin and thermoplastic elastomer; separating said plurality of semi-finished products from said drawing element by cutting in a drawing direction; drawing said drawing element separated from said plurality of semi-finished products by a drawing machine, thereby continuing to draw said plurality of semi-finished products and said drawing element which are before separation; and cutting said plurality of semi-finished products at a given length from which said drawing element has been separated.

2. The method for manufacturing a product of thermoplastic inelastic resin or thermoplastic elastomer, or a hybrid product of thermoplastic inelastic resin and thermoplastic elastomer according to claim 1, wherein said plurality of semi-finished products and said drawing element comprise an olefinic material.

3. The method for manufacturing a product of thermoplastic inelastic resin or thermoplastic elastomer, or a hybrid product of thermoplastic inelastic resin and thermoplastic elastomer according to claim 1, wherein the thickness of connecting elements for connecting said plurality of semi-finished products and said drawing element is from no less than 0.5 mm to no more than 10 mm.

4. The method for manufacturing a product of thermoplastic inelastic resin or thermoplastic elastomer, or a hybrid product of thermoplastic inelastic resin and thermoplastic elastomer according to claim 2, wherein the thickness of connecting elements for connecting said plurality of semi-finished products and said drawing element is from no less than 0.5 mm to no more than 10 mm.

5. The method for manufacturing a product of thermoplastic inelastic resin or thermoplastic elastomer, or a hybrid product of thermoplastic inelastic resin and thermoplastic elastomer according to claim 1, wherein said plurality of semi-finished products are oriented facing in a common direction.

6. The method for manufacturing a product of thermoplastic inelastic resin or thermoplastic elastomer, or a hybrid product of thermoplastic inelastic resin and thermoplastic elastomer according to claim 2, wherein said plurality of semi-finished products are oriented facing in a common direction.

7. The method for manufacturing a product of thermoplastic inelastic resin or thermoplastic elastomer, or a hybrid product of thermoplastic inelastic resin and thermoplastic elastomer according to claim 3, wherein said plurality of semi-finished products are oriented facing in a common direction.

8. The method for manufacturing a product of thermoplastic inelastic resin or thermoplastic elastomer, or a hybrid product of thermoplastic inelastic resin and thermoplastic elastomer according to claim 4, wherein said plurality of semi-finished products are oriented facing in a common direction.

\* \* \* \* \*